(12) United States Patent
Davis et al.

(10) Patent No.: US 8,905,476 B2
(45) Date of Patent: Dec. 9, 2014

(54) ADJUSTMENT MECHANISM FOR JUVENILE PRODUCT

(75) Inventors: Andrew R. Davis, Huber Heights, OH (US); Brian R. Pleiman, Troy, OH (US); David R. Sander, Liberty Township, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 101 days.

(21) Appl. No.: 13/586,257

(22) Filed: Aug. 15, 2012

(65) Prior Publication Data

US 2014/0049081 A1 Feb. 20, 2014

(51) Int. Cl.
*A47C 1/08* (2006.01)
*A47D 1/10* (2006.01)
*B60N 2/28* (2006.01)
*B60N 2/26* (2006.01)

(52) U.S. Cl.
CPC ............... *B60N 2/26* (2013.01); *B60N 2/2851* (2013.01); *B60N 2/2866* (2013.01)
USPC ............... 297/250.1; 297/256.11; 297/256.1; 297/353; 297/410

(58) Field of Classification Search
USPC ......... 297/256.11, 250.1, 256.1, 353, 411.36, 297/256.13, 410, 391; 428/407
See application file for complete search history.

(56) References Cited

U.S. PATENT DOCUMENTS

| | | | |
|---|---|---|---|
| 5,690,383 A | 11/1997 | Meeker | |
| 6,135,553 A * | 10/2000 | Lovie et al. | 297/250.1 |
| 6,491,343 B2 * | 12/2002 | Yamazaki | 297/250.1 |
| 6,932,709 B1 | 8/2005 | Gubitosi et al. | |
| 7,278,683 B2 * | 10/2007 | Williams et al. | 297/250.1 |
| 7,370,912 B2 * | 5/2008 | Williams et al. | 297/256.11 |
| 7,438,644 B2 | 10/2008 | Gubitosi et al. | |
| 7,614,979 B2 | 11/2009 | Thomson et al. | |
| 7,727,076 B2 | 6/2010 | Bapst et al. | |
| 7,909,401 B2 * | 3/2011 | Hofmann et al. | 297/284.11 |
| 8,052,213 B2 * | 11/2011 | Dahlbacka et al. | 297/284.4 |
| 8,272,690 B2 * | 9/2012 | Brandl et al. | 297/250.1 |
| 8,342,604 B2 * | 1/2013 | Heisey et al. | 297/256.1 |
| 2001/0011838 A1 * | 8/2001 | Kassai et al. | 297/250.1 |

* cited by examiner

*Primary Examiner* — Chi Q Nguyen
(74) *Attorney, Agent, or Firm* — Baker & Hostetler LLP

(57) ABSTRACT

A juvenile product adjustment mechanism which allows for easy, secure adjustment by a caregiver is comprised of a rotatable key received within a sliding channel operated by a resiliently biased push button.

20 Claims, 6 Drawing Sheets

ADJUSTMENT MECHANISM FOR JUVENILE PRODUCT

BACKGROUND OF THE INVENTION

1. Field of the Invention

The present invention relates generally to juvenile products, such as child car seats for use by children and their caregivers, and more particularly to adjustment mechanisms for use in connection with such products.

2. Description of the Related Art

Juvenile products are widely used by caregivers. Many of those products, such as car seats, have portions that occasionally need adjustment to accommodate children of different sizes. It is generally desired that such adjustment be quick and easy for the caregiver, but result in a secure adjustment.

While various devices have been used in the past to accomplish such adjustment, most of those prior art devices have been lacking in ease of adjustments, security, or both.

In sum, the prior art devices do not provide the important advantages of allowing the desired easy and secure adjustment of juvenile products, such as heard rest portions of child car seats and/or restraints.

SUMMARY OF THE INVENTION

It is an aspect of the present invention to provide an adjustment mechanism for a juvenile product that is easy for use by a caregiver and that provides a secure adjustment. Preferably, the adjustment mechanism of the present invention allows for at least two separate adjustment positions. In a preferred embodiment, the portion of the juvenile product being adjusted is a headrest portion of a child car seat or restraint.

More specifically, the adjustment mechanism of the present invention preferably consists of a rotatable key that is attached to a portion of the juvenile product being adjusted for height. The key is preferably operably connected to a sliding actuator that may be operated by a caregiver by manipulating a resiliently biased push button positioned on an upper portion thereof. Preferably the push button is resiliently biased by a spring that is compressed within a housing operably attached to a portion of the push button assembly. The rotatable key may preferably have a rectangular-shaped boss positioned on a back portion thereof. The portion of the juvenile product being adjusted may include alignment guides fixedly attached and protruding therefrom to be slidingly received in corresponding alignment channels positioned on the fixed portion of the juvenile product, such as, for example the seat/base portion of a juvenile car seat.

Also in a preferred embodiment, the adjustment mechanism of the present invention preferably includes an adjustment channel comprised of at least two adjustment lobes located on a portion of the fixed portion of the juvenile product to receive the rotatable key slidingly therethrough when said rectangular-shaped boss of said rotatable key is positioned parallel to the direction of travel of the portion of the juvenile product being adjusted, and which prevents sliding of the key (and the attached portion of the juvenile product being adjusted) when the rectangular-shaped boss is positioned transverse to the direction of travel of the portion of the juvenile product being adjusted.

Preferably, in operation, the adjustment mechanism of the present invention is operated by the caregiver by pressing the resiliently biased push button, thereby rotating the rectangular-shaped boss on the rotatable key parallel to the direction of travel of the portion of the juvenile product being adjusted, while simultaneously grasping a portion of (or a handle on a portion of) the juvenile product being adjusted. Preferably, the caregiver then adjusts the portion of the juvenile product being adjusted to a desired location and releases the resiliently biased push button. Assuming the adjustment position chosen by the caregiver has aligned the rotatable key within an adjustment lobe, the releasing of the resiliently biased push button allows the rotatable key to rotate within the adjustment lobe so that the rectangular-shaped boss is transverse to the adjustment direction of travel, thereby locking the portion of the juvenile product being adjusted into place. If the adjustment position chosen by the caregiver is out of alignment, the caregiver will be alerted by the push button not completely returning to home state and will need to move the portion of the juvenile product being adjusted slightly one direction or the other in order to obtain proper alignment and locking of the portion of the juvenile product being adjusted into place. Once proper alignment and locking has occurred, the resiliently biased push button will be biased back to the home state.

These and other aspects and objects, along with advantages and features of the invention disclosed herein, will be made more apparent from the description, drawings, and claims that follow.

BRIEF DESCRIPTION OF THE DRAWINGS

The foregoing and other aspects, objects, features, and advantages of the present invention, as well as the invention itself, will be more fully understood from the following description of preferred embodiments, when read together with the accompanying drawings, in which.

DETAILED DESCRIPTION

Figure 1:
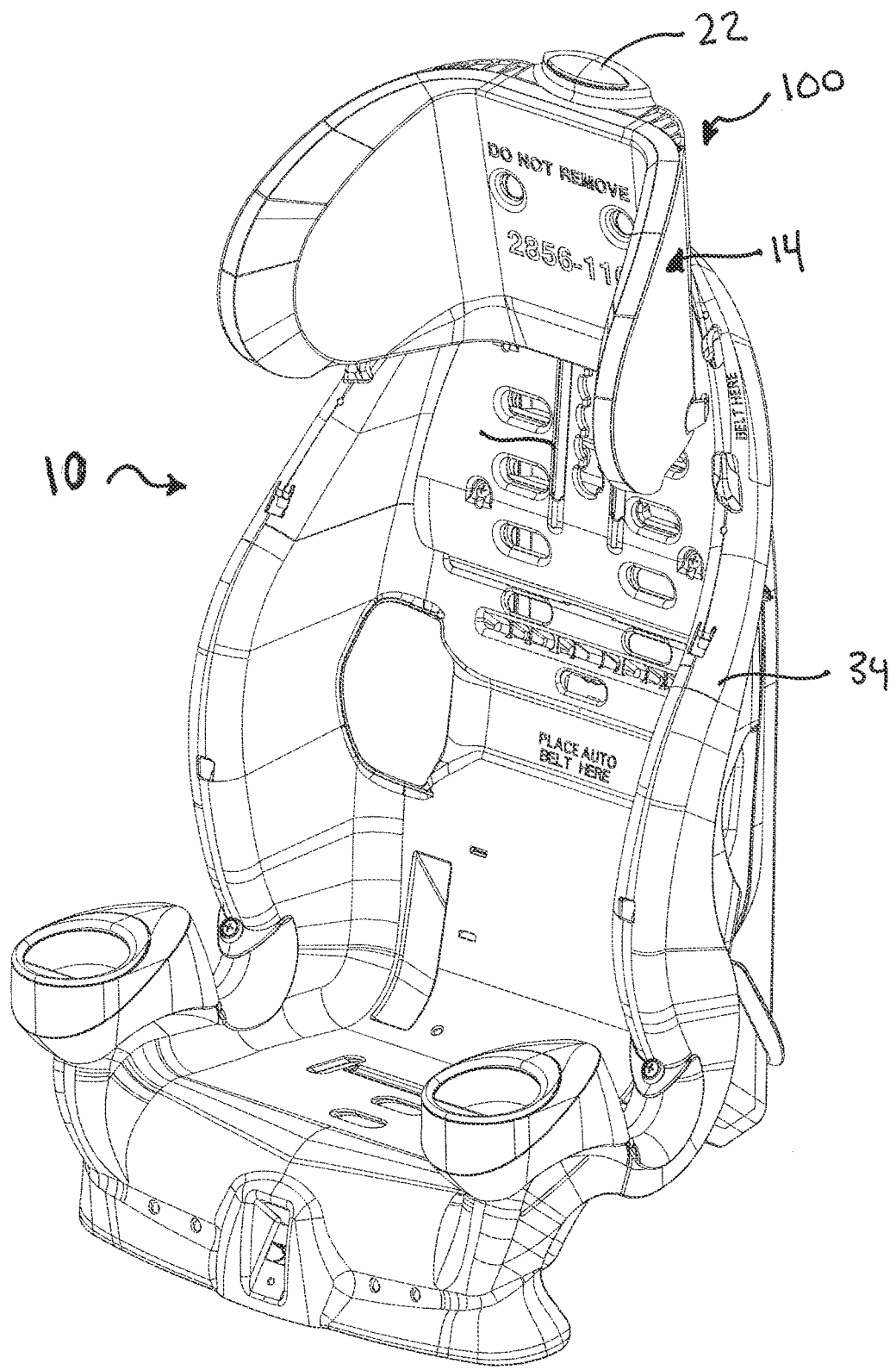
FIG. 1 is a front isometric view of a child car seat utilizing an adjustment mechanism in accordance with the present invention.

Referring to FIG. 1, an adjustment mechanism 100 in accordance with the present invention may be incorporated in a child car seat 10.

Figure 2:
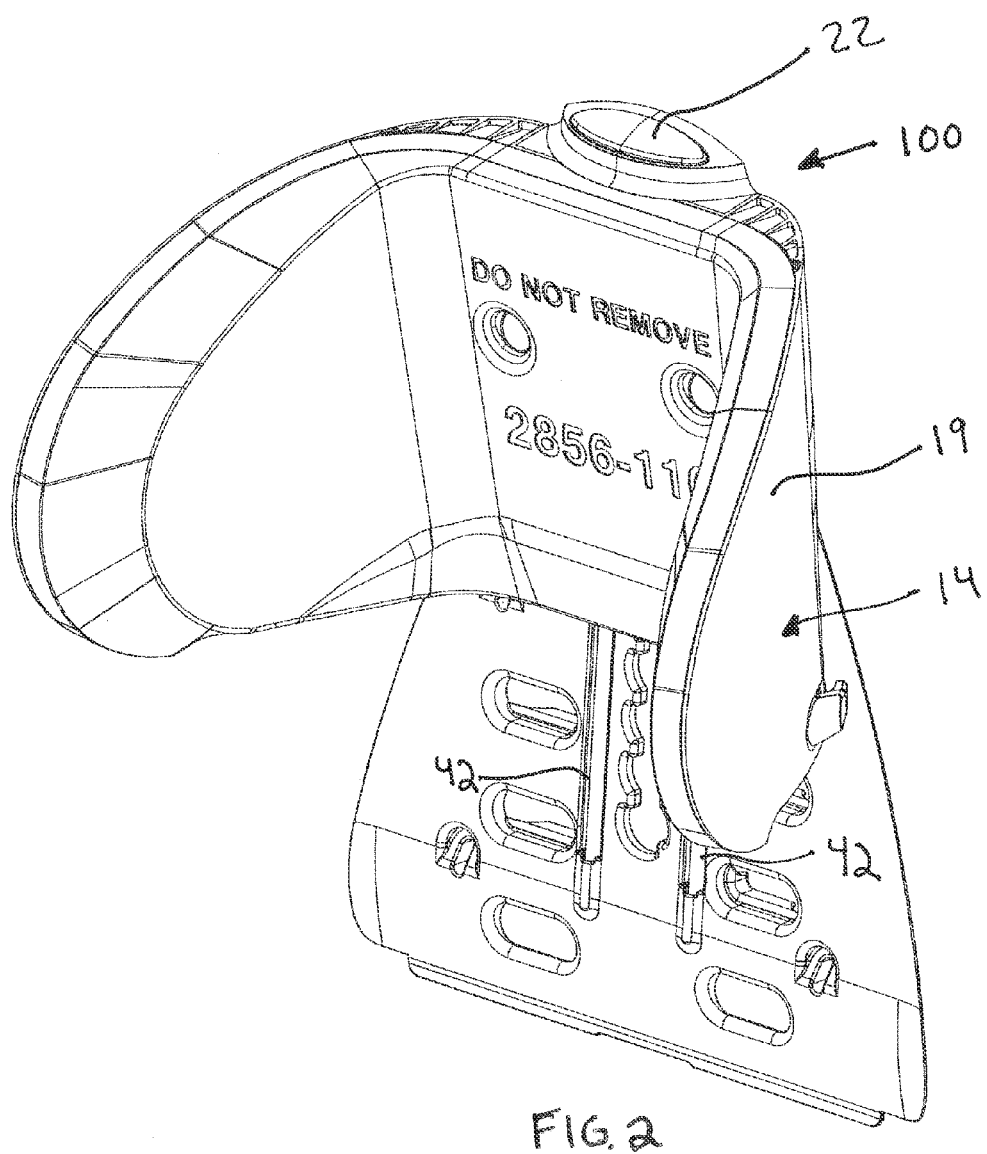
FIG. 2 is a front isometric view of a headrest and portion of a child car seat for use in a child car seat utilizing an adjustment mechanism in accordance with the present invention.
Figure 3:
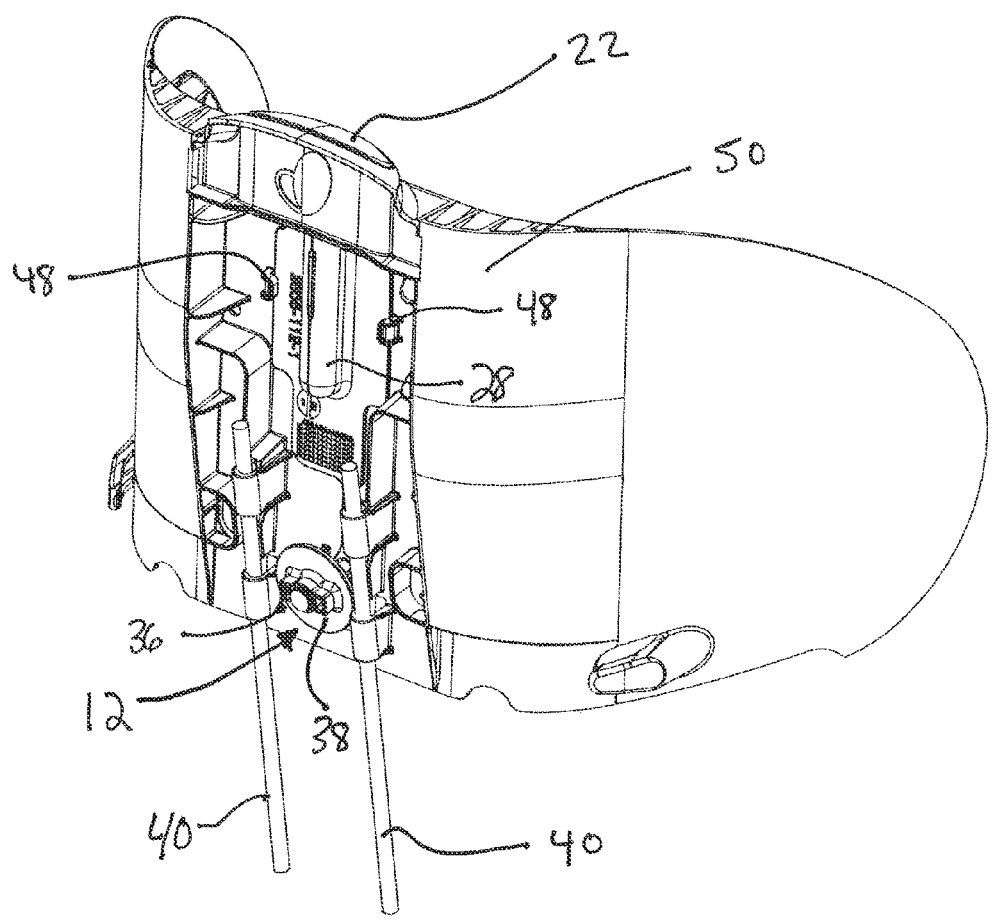
FIG. 3 is a rear isometric view of the headrest portion shown in FIG. 2 for use in a child car seat utilizing an adjustment mechanism in accordance with the present invention.
Figure 4:
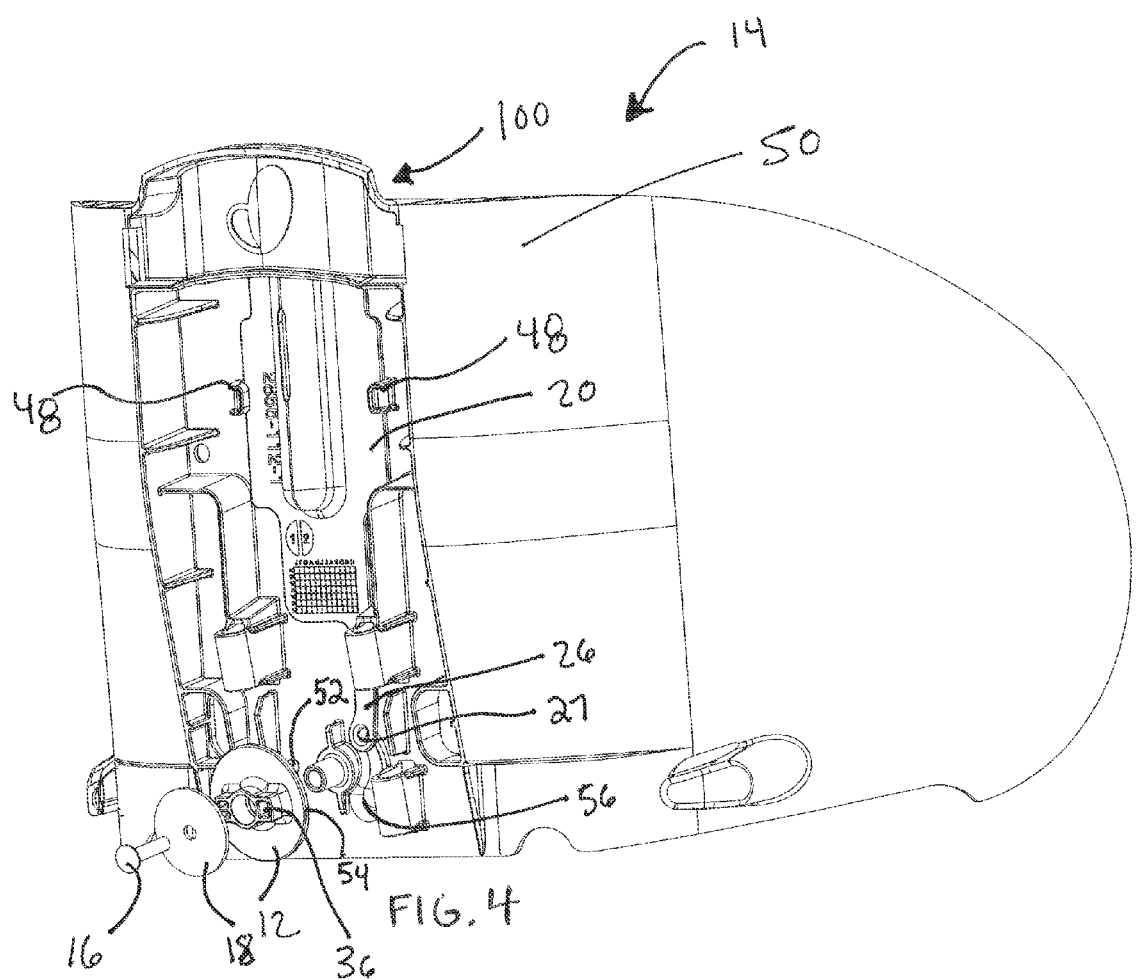
FIG. 4 is an exploded rear isometric view of the headrest portion shown in FIG. 2 for use in a child car seat utilizing an adjustment mechanism in accordance with the present invention.

As shown best in FIGS. 2, 3 and 4, more specifically, the adjustment mechanism of the present invention preferably consists of a rotatable key 12 that is rotatably attached to a portion of the juvenile product being adjusted for height, such as a car seat headrest portion 14. The key 12 may be rotatably attached to the headrest portion 14 of the car seat 10 by means of a fastener 16, such as a screw, rivet, or the like, and preferably includes a washer 18 to facilitate rotation. The headrest portion 14 may include a headrest cover 19 if desired. The key 12 is preferably operably connected to a sliding actuator 20 that may be operated by a caregiver by manipulating a resiliently biased push button 22 positioned on an upper portion thereof. Preferably the push button 22 comprises a portion of the push button assembly 24 including the push button 22, the sliding actuator 20 (having an attachment leg 26 with follower hole 27 therein), a spring channel 28 and a spring 30.

Figure 5:
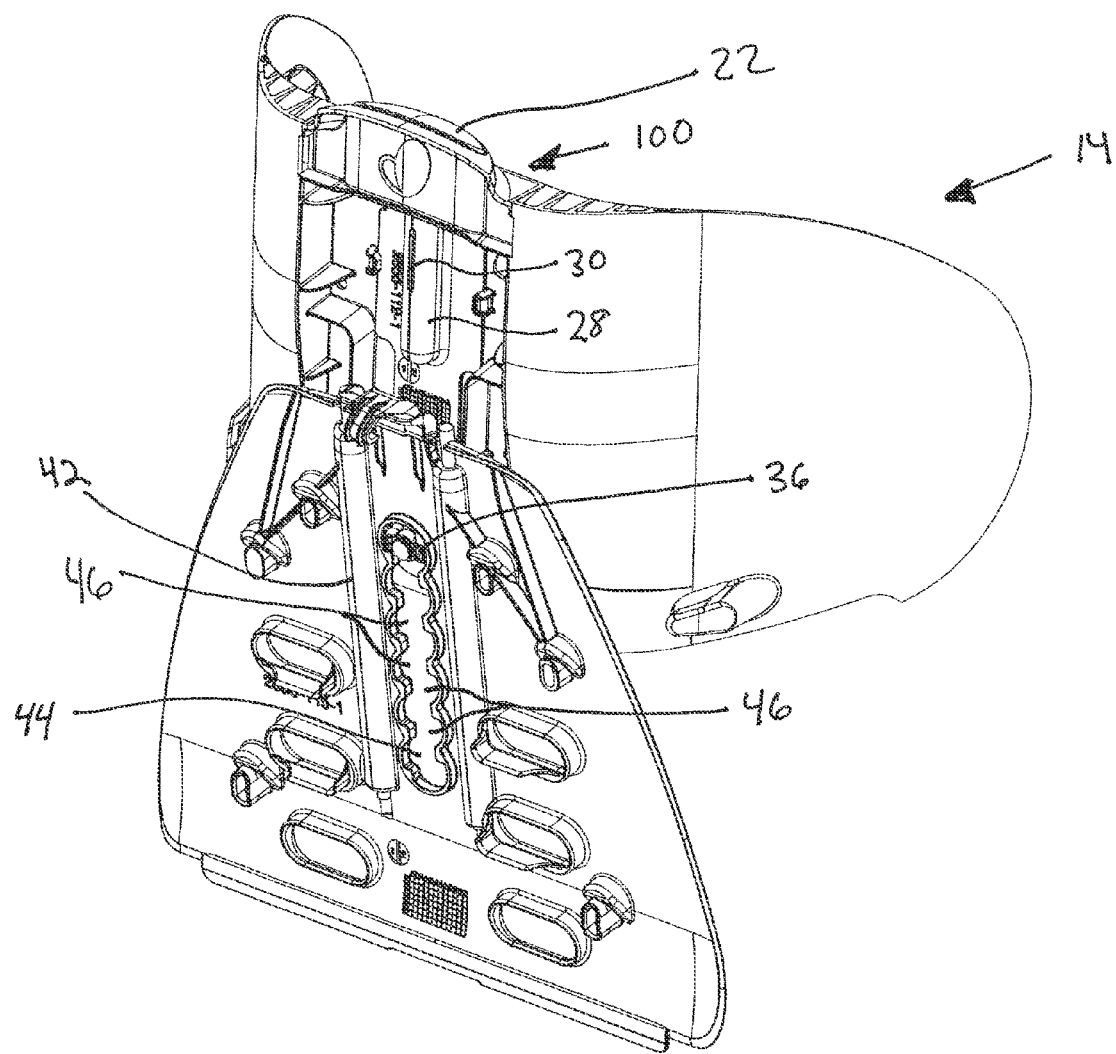
FIG. 5 is a rear isometric view of the headrest and portion of a child car seat for use in a child car seat utilizing an adjustment mechanism as shown in FIG. 2.
Figure 6:
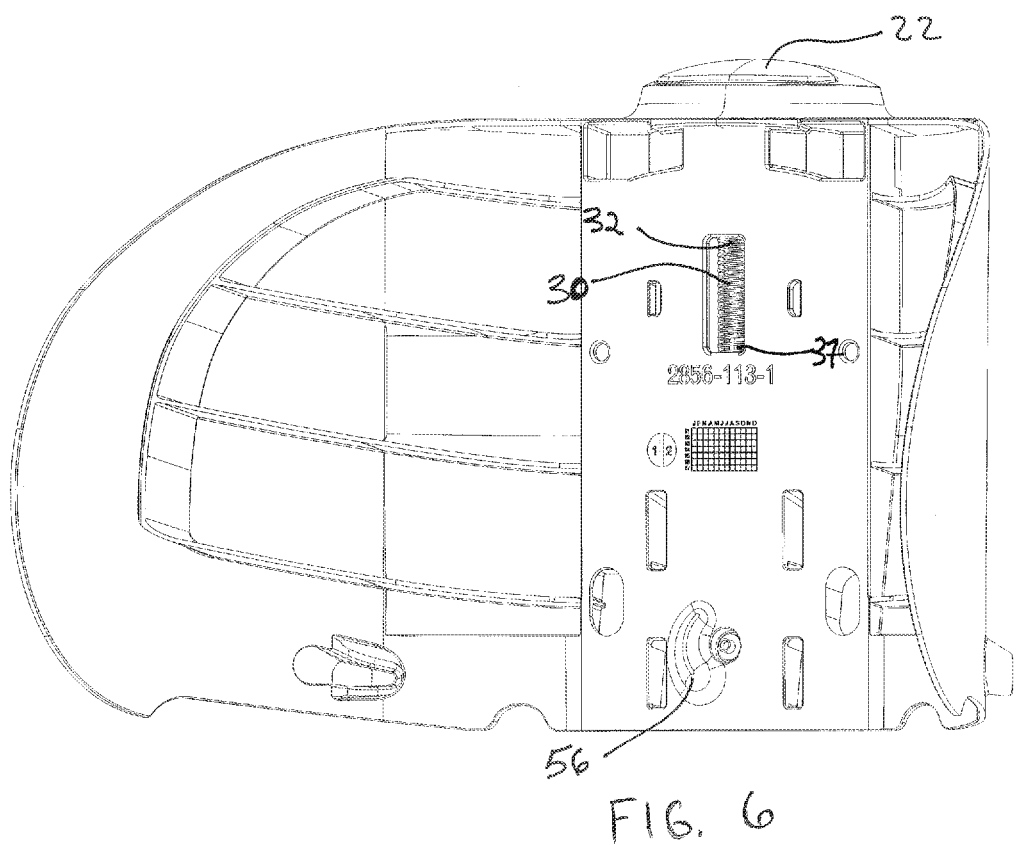
FIG. 6 is a front isometric view of the headrest portion as shown in FIG. 2 with the headrest cover removed.

As shown best in FIGS. 5 and 6, while a person of ordinary skill in the art will recognize many different ways of providing resilient biasing to the push button 22, resilient biasing may be accomplished by housing the spring 30 in a spring channel 28 formed on the back of the sliding actuator 20. The spring channel 28 may preferably include a seat 32 on a top portion thereof for receiving a top portion of the spring 30. Conversely, a portion of the juvenile product not being adjusted, such as a car seat base 34, may preferably include a shelf 37 for receiving the bottom portion of the spring 30. Accordingly, when the push button 22 is pushed downwardly by a caregiver, the spring 30 is compressed between the seat 32 and the shelf 37, providing the desired resilient bias. Additionally, the length of the spring channel 28 length may be selected so as to provide the desired travel for the push button 22.

In an embodiment of the invention, the rotatable key 12 may preferably have a rectangular-shaped boss 36 positioned on a back portion 38 thereof. The portion of the juvenile product being adjusted, such as a head rest portion 14 of a child car seat 10, may include alignment guides 40 fixedly attached to and protruding therefrom to be slidingly received in corresponding alignment channels 42 positioned on the fixed portion of the juvenile product, such as, for example the car seat base 34.

Also in a preferred embodiment, the adjustment mechanism 100 of the present invention preferably includes an adjustment channel 44 comprised of at least two adjustment lobes 46 located on a portion of the fixed portion of the juvenile product to receive the rotatable key 12 slidingly therethrough when said rectangular-shaped boss 36 of said rotatable key 12 is positioned parallel to the direction of travel of the portion of the juvenile product being adjusted, and which prevents sliding of the key 12 (and the attached portion of the juvenile product being adjusted) when the rectangular-shaped boss 36 is positioned transverse to the direction of travel of the portion of the juvenile product being adjusted (see FIG. 5).

Preferably, in operation, the adjustment mechanism of the present invention is operated by the caregiver by pressing the resiliently biased push button 22, thereby rotating the rectangular-shaped boss 36 on the rotatable key 12 parallel to the direction of travel of the portion of the juvenile product being adjusted, while simultaneously grasping a portion of (or a handle on a portion of) the juvenile product being adjusted. Specifically, as will be apparent to a person of ordinary skill in the art, the rotating movement of the rotatable key 12 may be accomplished in any number of known ways. In one embodiment disclosed herein, the rotating movement may be achieved by the sliding actuator 20 sliding through alignment nubs 48 positioned on the back side 50 of the headrest juvenile product. The attachment leg 26 includes a follower hole 27 that is shaped to rotatably receive a nub 52 positioned on a front portion 54 of the rotatable key 12. In an embodiment, the backside of the headrest 50 may include a nub groove 56 to facilitate the interaction and securement of the nub 52 in the follower hole 27 on the attachment leg 26. Thus, the pushing down of the button 22 causes the attachment leg 26 to move down, thereby rotating the rotatable key 12, thereby rotating the corresponding rectangular shaped boss 36 to the desired position parallel to the direction of adjustment allowing the portion of the juvenile product being adjusted to be moved. Conversely, once a desired adjustment position is reached, the caregiver may release the push button 22 allowing the sliding actuator 20 (and attached attachment leg 26) to rotate the rotatable key 12 such that the rectangular shaped boss 36 is positioned transverse to the direction of adjustment and is captured in a desired adjustment lobe 46 thereby locking the portion of the juvenile product being adjusted into place. If the adjustment position chosen by the caregiver is out of alignment, the caregiver will be alerted by the push button 22 not completely returning to home state and the caregiver will be alerted to move the portion of the juvenile product being adjusted slightly one direction or the other in order to obtain proper alignment and locking of the portion of the juvenile product being adjusted into place. Once proper alignment and locking has occurred, the resiliently biased push button 22 will be biased back to the home state.

Following from the above description and invention summaries it should be apparent to those of ordinary skill in the art that, while the systems and processes herein described constitute exemplary embodiments of the present invention, it is understood that the invention is not limited to these precise systems and processes and that changes may be made therein without departing from the scope of the invention as defined by the following claims. Additionally, it is to be understood that the invention is defined by the claims and it is not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claim, as the invention is defined by the claims and because inherent and/or unforeseen advantages of the present invention may exist even though they may not have been explicitly discussed herein.

What is claimed is:

1. A juvenile product adjustment mechanism comprising a channel shaped to receive a rotatable key slidingly therethrough, the channel comprising at least two adjustment lobes, wherein each of said adjustment lobes is facing to each other, wherein the key further comprises a boss portion on a back portion thereof, having a width greater than a length thereof, shaped to slide between the adjustment lobes when the length of the boss is positioned parallel to the direction of adjustment of a portion of the juvenile product being adjusted and is prevented from sliding between the adjustment lobes when the length of the boss is positioned transverse to the direction of adjustment of the portion of the juvenile product being adjusted.

2. The juvenile product adjustment mechanism of claim 1 wherein the boss is rectangular shaped.

3. The juvenile product adjustment mechanism of claim 2 wherein the juvenile product being adjusted is a child car seat and the portion of the juvenile product being adjusted is a headrest.

4. The juvenile product adjustment mechanism of claim 3 wherein said headrest includes alignment guides fixedly attached thereto and said car seat includes a base portion, said base portion including alignment channels therein shaped to slidingly receive said alignment guides.

5. The juvenile product adjustment mechanism of claim 1 wherein the rotatable key is operated by means of a push button.

6. The juvenile product adjustment mechanism of claim 5 wherein said push button is resiliently biased.

7. The juvenile product adjustment mechanism of claim 6 wherein said push button is operably connected to said rotatable key by a sliding actuator.

8. The juvenile product adjustment mechanism of claim 7 wherein said sliding actuator includes an attachment leg operably connected to said rotatable key.

9. The juvenile product adjustment mechanism of claim 8 wherein said rotatable key includes a nub on the front portion thereof and said attachment leg includes a follower hole on a portion thereof shaped to operably receive said nub.

10. The juvenile product adjustment mechanism of claim 7 wherein said sliding actuator includes a spring channel therein shaped to receive a spring for resiliently biasing said push button.

11. The juvenile product adjustment mechanism of claim 1 wherein said rotatable key is rotatably mounted on said portion of juvenile product being adjusted by a washer and a fastener.

12. The juvenile product adjustment mechanism of claim 11 wherein said fastener is a screw.

13. The juvenile product adjustment mechanism of claim 1 wherein said adjustment lobes are circular in shape.

14. A juvenile product adjustment mechanism comprising a channel shaped to receive a rotatable key slidingly therethrough, the channel comprising at least two adjustment lobes, wherein each of said adjustment lobes is facing to each other, wherein the key further comprises a boss portion on a back portion thereof, having a width greater than a length thereof, shaped to slide between the adjustment lobes when the length of the boss is positioned parallel to the direction of adjustment of a portion of the juvenile product being adjusted and is prevented from sliding between the adjustment lobes when the length of the boss is positioned transverse to the direction of adjustment of the portion of the juvenile product being adjusted; wherein said rotatable key is operably connected to and rotated by a resiliently biased push button.

15. The juvenile product adjustment mechanism of claim 14 wherein the boss is rectangular shaped.

16. The juvenile product adjustment mechanism of claim 15 wherein the juvenile product being adjusted is a child car seat and the portion of the juvenile product being adjusted is a headrest.

17. The juvenile product adjustment mechanism of claim 16 wherein said push button is operably connected to said rotatable key by a sliding actuator including an attachment leg operably connected to said rotatable key.

18. The juvenile product adjustment mechanism of claim 17 wherein said rotatable key includes a nub on the front portion thereof and said attachment leg includes a follower hole on a portion thereof shaped to operably receive said nub.

19. The juvenile product adjustment mechanism of claim 18 wherein said headrest includes alignment guides fixedly attached thereto and said car seat include a base portion, said base portion including alignment channels therein shaped to slidingly receive said alignment guides.

20. A headrest height adjustment mechanism for a child car seat, said child car seat comprising a headrest and a base portion, said adjustment mechanism comprising a channel on said base portion shaped to receive a rotatable key slidingly therethrough, the channel comprising at least two adjustment lobes, wherein each of said adjustment lobes is facing to each other, wherein the key further comprises a boss portion on a back portion thereof, having a width greater than a length thereof, shaped to slide between the adjustment lobes when the length of the boss is positioned parallel to the direction of adjustment of the headrest and is prevented from sliding between the adjustment lobes when the length of the boss is positioned transverse to the direction of the headrest; wherein said rotatable key is operably connected to and rotated by a resiliently biased push button.

\* \* \* \* \*